US011979304B1

(12) United States Patent
Arunachalam et al.

(10) Patent No.: US 11,979,304 B1
(45) Date of Patent: May 7, 2024

(54) SYSTEM AND METHOD FOR ESTIMATING NETWORK PERFORMANCE

(71) Applicant: VERIZON PATENT AND LICENSING INC., Basking Ridge, NJ (US)

(72) Inventors: Harish Arunachalam, Frisco, TX (US); Vipul K. Jha, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/052,322

(22) Filed: Nov. 3, 2022

(51) Int. Cl.
*H04L 43/0817* (2022.01)
*H04L 41/08* (2022.01)
*H04L 41/0823* (2022.01)
*H04L 43/065* (2022.01)

(52) U.S. Cl.
CPC ...... *H04L 43/0817* (2013.01); *H04L 41/0823* (2013.01); *H04L 41/0883* (2013.01); *H04L 43/065* (2013.01)

(58) Field of Classification Search
CPC ............. H04L 43/0817; H04L 41/0823; H04L 41/0883; H04L 43/065
See application file for complete search history.

(56) References Cited

U.S. PATENT DOCUMENTS

| 10,939,444 | B1* | 3/2021 | Bellamkonda | H04W 16/28 |
| 11,147,040 | B1* | 10/2021 | Zana | H04W 72/0453 |
| 11,363,544 | B1* | 6/2022 | Rohit Kumar | G10L 25/21 |
| 2015/0146547 | A1* | 5/2015 | Kapnadak | H04W 28/0236 370/252 |
| 2015/0365954 | A1* | 12/2015 | Levine | H04W 72/563 455/450 |
| 2018/0242178 | A1* | 8/2018 | Barton | H04W 24/08 |
| 2018/0262533 | A1* | 9/2018 | McCaig | H04L 63/1441 |
| 2019/0190837 | A1* | 6/2019 | Wright | H04L 47/22 |
| 2019/0208438 | A1* | 7/2019 | Yang | H04W 28/021 |
| 2020/0092181 | A1* | 3/2020 | Thiagarajan | H04L 43/062 |
| 2021/0256222 | A1* | 8/2021 | Marinovic | G06N 5/022 |
| 2022/0078806 | A1* | 3/2022 | Sevindik | H04W 72/12 |
| 2022/0174518 | A1* | 6/2022 | Kerl | H04L 43/0888 |
| 2022/0400487 | A1* | 12/2022 | Sevindik | H04W 72/0453 |

* cited by examiner

*Primary Examiner* — Philip C Lee

(57) ABSTRACT

Techniques for determining a network health score for a network are disclosed. In one embodiment, a method is disclosed comprising obtaining network data associated with one or more user equipments (UEs) connected to a network, generating UE data for the one or more UEs using the network data, the generating comprising assigning each UE to a UE category from a set of UE categories, determining a set of UE category weights corresponding to the set of UE categories using the network data, determining at least one network health score for the one or more UEs using the network data, the generated UE data and the set of UE category weights and causing performance or at least one action in accordance with the determined at least one network health score.

18 Claims, 7 Drawing Sheets

| ACCESS DEVICE ID ⌐304 | MAC ID ⌐306 | HOST NAME ⌐308 | RSSI ⌐310 | TX PACKETS ⌐312 | RX PACKETS ⌐314 |
|---|---|---|---|---|---|
| AD ID 1 | MAC ID | CARLA-IPHONE | -54dBM | TX PACKETS | RX PACKETS |
| AD ID 1 | MAC ID | GAMEBOX | -73dBM | TX PACKETS | RX PACKETS |
| AD ID 1 | MAC ID | MACBOOK | -85dBM | TX PACKETS | RX PACKETS |

| 418 UE ID | 420 DAY 1 | 422 DAY 2 | 424 DAY 3 | 426 DAY 4 | 428 DAY 5 | 430 DAY 6 | 432 DAY 7 |
|---|---|---|---|---|---|---|---|
| UE 1 | 1 | 1 | 1 | 1 | 1 | 1 | 1 |
| UE 2 | 1 | 1 | 1 | -1 | -1 | 1 | 1 |
| UE 3 | 1 | 1 | 1 | 1 | -1 | 1 | 1 |

416

| 442 UE ID | 444 MANUFACTURER | 446 CATEGORY ID | 448 UE RANK | 450 MAPPED RSSI SCORE (MRSSI) |
|---|---|---|---|---|
| UE 1 | APPLE | CAT 1 | 7 | 1 |
| UE 2 | SONY | CAT 4 | 3 | 0.5 |
| UE 3 | APPLE | CAT 1 | 6 | 0.1 |

440

| 462 CATEGORY ID | 464 CATEGORY WEIGHT |
|---|---|
| CAT 1 | 0.4 |
| CAT 2 | 0.3 |
| CAT 3 | 0.1 |

| ACCESS DEVICE ID 504 | DATE 506 | SCORE 508 |
|---|---|---|
| AD ID 1 | MM.DD.YYY | 0.87 |
| AD ID 2 | MM.DD.YYY | 0.65 |

502

| ACCESS DEVICE ID 512 | DATE 514 | UE CATEGORY 516 | UE CATEGORY SCORE 518 |
|---|---|---|---|
| AD ID 1 | MM.DD.YYY | CAT 1 | 0.6 |
| AD ID 1 | MM.DD.YYY | CAT 2 | 0.27 |

SYSTEM AND METHOD FOR ESTIMATING NETWORK PERFORMANCE

BACKGROUND INFORMATION

A user may use a device (e.g., user equipment, or UE) to connect to a network (e.g., a network operated by a network service provider) via an access point (e.g., a modem, router, or the like). For example, a wireless (e.g., Wi-Fi) router may be installed at a user's premises, and the user may use a UE to access the network via the wireless router. Information about the state, or health, of the network is useful to an entity, such as the network service provider.

BRIEF DESCRIPTION OF THE DRAWINGS

FIGS. 3-5 provide examples of data used in network health score estimation in accordance with one or more embodiments of the present disclosure;

DETAILED DESCRIPTION

The disclosed embodiments provide novel systems and methods for determining the health of a wireless, or Wi-Fi, network. Embodiments of the present disclosure use retrieved network data to determine a network health score for a network, a network device (e.g., access point) and/or for each of a number of different categories of user equipments (UEs) connected to the network. A network health score can be used to identify a current outage or a potential future outage, improve customer service, identify potential upgrades and/or fixes, recommend installation options for new and/or existing sites, automatically perform a maintenance operation, or the like.

A network service provider (or other entity) can perform one or more actions (and/or activities) with respect to a network user based on a determined network health score. The actions and/or activities may include, for example, identifying users that are likely to encounter (or are encountering) a network service disruption based on a determined network health score, and sending a notification of the service disruption to the identified users and/or performing remedial actions and/or activities to avoid or correct the disruption.

The actions and/or activities may also include, for example, targeting notifications and/or firmware/software upgrades to particular users based on a determined network health score. The actions and/or activities may also include, for example, making service and/or device upgrades.

The action and/or activities may also include, for example, using one or more associated network health scores to identify an intent of a user, or customer, responsive to the user contacting a support channel. An identified intent can be used to direct the user to an appropriate support channel (e.g., billing, technical support, etc.).

The action and/or activities can also include, for example, identifying site-specific hardware (e.g., signal boosting equipment) recommendations based on a determined network health score. The action and/or activities may also include, for example, initiating a self-healing hardware reboot (e.g., during a period of low usage) based on a determined network health score.

In according with one or more embodiments, techniques for determining least one network health score for a network. The health score determination can comprise obtaining network data associated with one or more UEs connected to a network, generating UE data for the one or more UEs using the network data, the generating comprising assigning each UE to a UE category from a set of UE categories, determining a set of UE category weights corresponding to the set of UE categories using the network data, determining at least one network health score for the one or more UEs using the network data, the generated UE data and the set of UE category weights and causing performance or at least one action (and/or activity) in accordance with the determined at least one network health score.

Figure 1:
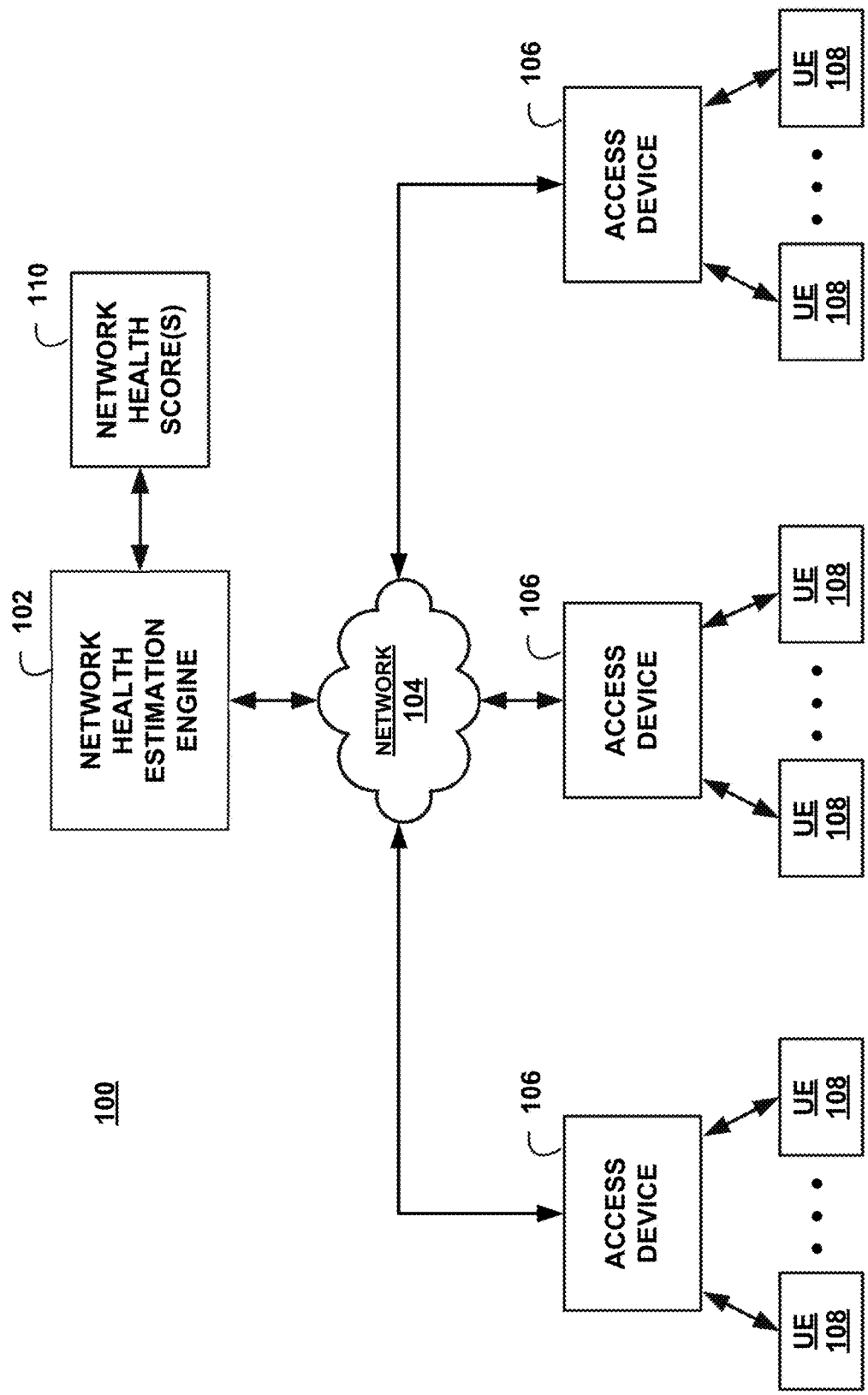
FIG. 1 provides an example illustrating an overview of network health score estimations in accordance with one or more embodiments of the present disclosure.

FIG. 1 provides an example illustrating an overview of network health score estimations in accordance with one or more embodiments of the present disclosure. As shown in example 100 of FIG. 1, a network device, such as access device 106, can be used by user equipment (UE) 108 to access a network 104. Network 104 can be provided by a network service provider. By way of a non-limiting example, network 104 can include any type of network operated by the network service provider, such as any type of wired or wireless network.

As an example of a wired network, network 104 can include a Public Switched Telephone Network (PSTN) or a fiber optic cable network (e.g., Verizon™ FiOS). As an example of a wireless network, network 104 can include a Public Land Mobile Network (PLMN) or a satellite network. Network 104 can interconnect with another network (not shown) via, for example, a gateway, such that a UE 108 connected to network 104 can send and/or receive data across network 104 to/from destination devices in the other network. The other network may, in some implementations, include the Internet.

In accordance with one or more embodiments, access device 106 can include a wired and/or wireless modem, router, and/or modem/router combination, a base station (e.g., eNB or gNB), or any other type of wired or wireless device that serves as a network access point to network 104. Access device 106 can include, in one example, a modem/router combination that includes wireless functionality for implementing wireless local area network (LAN) (e.g., Wi-Fi) that enables a UE 108 to wirelessly connect to network 104 via the wireless LAN.

The access device 106 can also include, in another example, functionality for implementing a wired LAN that enables a UE 108 to connect to network 104 via a wired connection to access device 106. The UEs 108 can each include any type of electronic device that includes wired and/or wireless communication capabilities. The UEs 108 can each include, for example, a desktop, laptop, palmtop or tablet computer, a cellular telephone (e.g., a "smart" phone), a personal digital assistant (PDA), a music player (e.g., a digital audio player), a digital camera, an Internet of Things (IoT) or Machine-to-Machine (M2M) device, an audio speaker(s) (e.g., a "smart" speaker), a "smart" television, a gaming device, an embedded computing device, etc.

In accordance with one or more embodiments, network health estimation engine 102 can be communicatively coupled to access device 106 (e.g., via network 104) and can be configured to retrieve network data associated with each UE 108 connected to the access device 106. By way of a non-limiting example, the network data can comprise parametric data (or network communication protocol parameters) maintained by an access device 106 in connection with each UE 108 connected to the access device 106. By way of a further non-limiting example, the network communication protocol parameters can include Technical Report 069 (TR-069) parameters. TR-069 includes an application layer protocol for the remote management of customer premises equipment (CPEs) that connect to a network. In other implementations, however, other parameters associated with network communication protocols that are different than TR-069 may be used.

The TR-069 parameters can include various different device or network-related parameters exchanged between each respective access device 106 and network 104 upon establishment of a connection between a UE 108 and network 104 via the access device 106. By way of some non-limiting examples, for a UE 108, TR-069 parameters can include a Medium Access Control (MAC) address and host name assigned to the UE 108, received signal strength indicator (RSSI) data, and information indicating a number of data packets received and transmitted by the UE 108 (e.g., during a specific period of time).

Each respective access device 106, or another network device(s) (not shown) within or connected to network 104, can obtain the network communication protocol parameters (e.g., TR-069 parameters) associated with each network-connected UE 108, and can supply those parameters to network health estimation engine 102. By way of a non-limiting example, access device 106 can supply the network communication protocol parameters associated with each UE 108 connected thereto to network health estimation engine 102 in response to a request (e.g., a TR-069 parameter pull request) received from engine 102. By way of a further non-limiting example, network health estimation engine 102 can fetch the network communications protocol parameters from a store that hosts the data.

In accordance with one or more embodiments, network health estimation engine 102 can use the obtained network communication protocol parameters to generate, or derive, other information, such as and without limitation UE manufacturer, UE category, mapped RSSI, UE frequency, and UE rank information, or data. In accordance with one or more embodiments, the obtained network communication protocol parameters and the information derived from the network communications protocol parameters can be used to generate network health scores 110. By way of some non-limiting examples, the network health scores 110 can be generated for a given period of time (e.g., daily, weekly, etc.) and can be determined for a given access device 106. By way of a further non-limiting example, a network health score 110 can be determined for a number of UE categories and a given access device 106.

In accordance with one or more embodiments, network health scores 110 determined for one or more access devices 106 corresponding to a geographic area can be used to determine the network health score 110 of the geographic area. One or more actions and/or activities can be taken in response to the network health score 110 determined for the geographic area.

Figure 2:
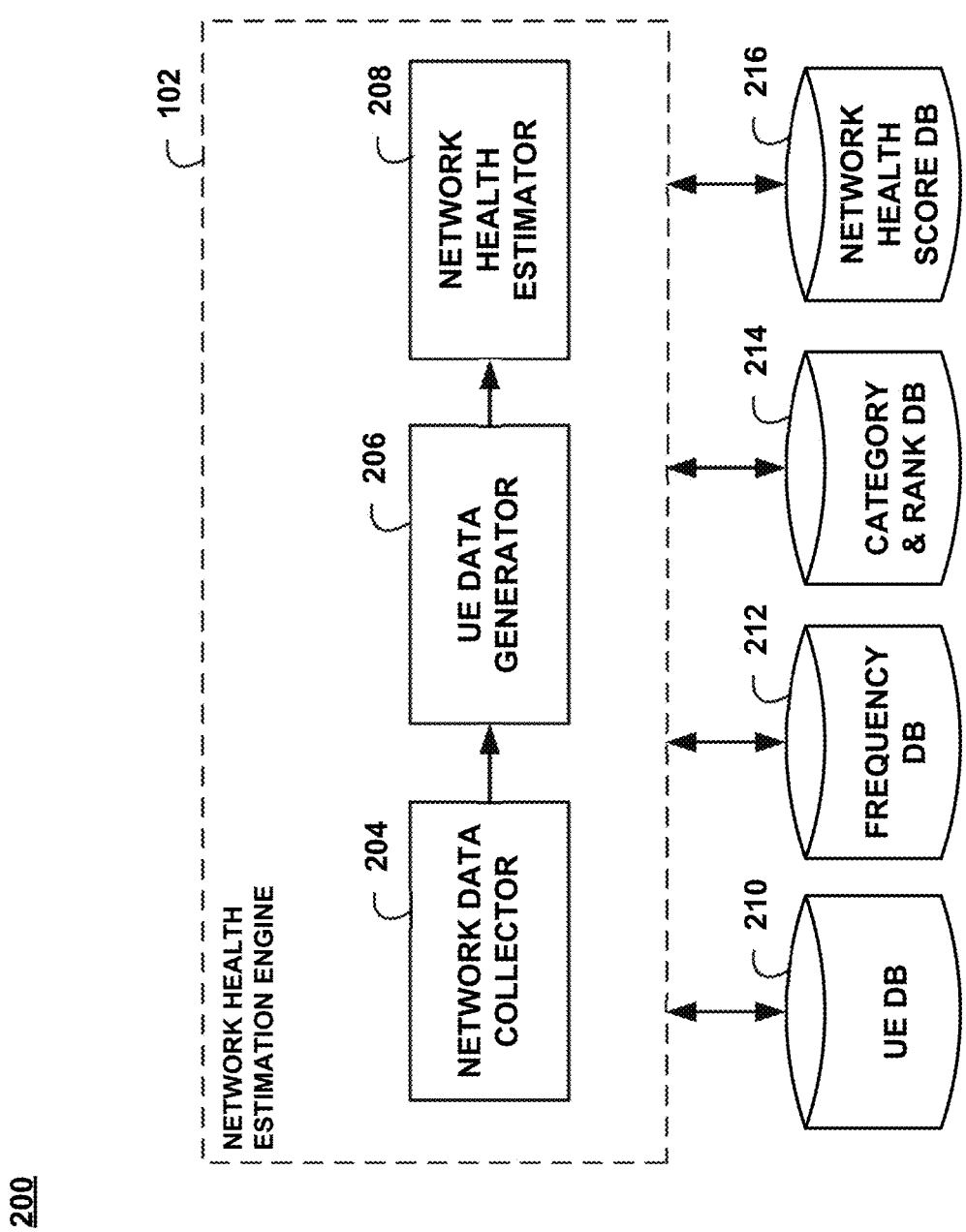
FIG. 2 provides an example illustrating components of a network health estimation engine in accordance with one or more embodiments of the present disclosure.

FIG. 2 provides an example illustrating components of a network health score estimation engine in accordance with one or more embodiments of the present disclosure. As shown in example 200 of FIG. 2, network health estimation engine 102 can comprise a network data collector 204, UE data generator 206 and network health estimator 208. In accordance with one or more embodiments, network data collector 204 can obtain network communication protocol parameters from each of a number of access devices 106 and save the obtained data in UE database (DB) 210. By way of a non-limiting example, network data collector 204 can obtain and store the network communication protocol parameters periodically (e.g., daily, weekly, monthly). While a daily period is used herein in describing embodiments of the present disclosure, any period of time can be used.

By way of a non-limiting example, network data collector 204 can use a TR-069 pull request to obtain the network communication protocol parameters. As discussed, various different device or network-related parametric data can be obtained and stored in UE DB 210. Some non-limiting examples, for a UE 108, TR-069 parameters can include a Medium Access Control (MAC) address and host name assigned to the UE 108, received signal strength indicator (RSSI) data, and information indicating a number of data packets received and transmitted by the UE 108.

Data structure 302, shown in example 300 of FIG. 3, can be used to store network communication protocol parameters obtained from each access device 106 in UE DB 210. Data structure 302 can comprise a number of network data fields, such as and without limitation a access device ID field 304, MAC ID field 306, host name field 308, RSSI field 310, TX packet field 312 and RX packet field 314. Access device ID field 304 can store a unique identifier for an access device 106 from which the network communication protocol parameters are obtained. By way of a non-limiting example, in a case that access device 106 is a router, access device ID field 304 can store a router ID.

Fields 306-314 can be used to store data about a UE 108 connected to the access device 106 identified in access device ID field 304. MAC ID field 306 can store the MAC address of the UE 108, host name field 308 can store a name assigned to the UE 108, RSSI field 310 can store signal strength data, and TX packet field 312 and RX packet field 314 can store information indicating a number of data packets received and transmitted by the UE 108.

Referring again to FIG. 2, UE data generator 206 can use data stored in UE DB 210 (e.g., data stored in data structure 302) to generate data that is then stored in frequency DB 212 and category and rank DB 214.

Data structure 416, shown in example 400 of FIG. 4, can be used to store UE frequency data in frequency DB 212. In accordance with one or more embodiments, frequency data, for a UE, is representative of a number of periods of time, each period corresponding to an attempt to obtain network data for the UE, the frequency data indicating either the presence or absence of network data for each attempt.

As discussed, network data collector 204 can periodically (e.g., daily, weekly, etc.) obtain network communication protocol parameters from an access device 106. The network communication protocol parameters obtained for a respective period (e.g., a day, week, etc.) can be used to determine whether or not a respective UE 108 is "seen." By way of a non-limiting example, the respective UE 108 is "seen" in the respective period if network communication protocol parameters corresponding to the respective period are obtained by the network data collector 204 for the UE 108 (from the access device 106).

In example 400 of FIG. 4, data structure 416 stores daily frequency data corresponding to a daily fetch of network communication protocol parameters by network data collector 204 (from an access device 106). UE ID field 418 stores a unique identifier (ID) for a UE 108. By way of a non-limiting example, the UE ID for a UE 108 can be its MAC address (or MAC ID), a unique ID generated by a component (e.g., UE data generator 206) of network health estimation engine 102, or the like. Fields 420-432 store a value (e.g., 1 or −1) indicating whether or not the UE 108 is seen for the period of time, which in example 400 is a day.

By way of a non-limiting example, UE data generator 206 can store a "1" in one of fields 420-432 corresponding to a respective period to indicate the presence of network communication protocol parameters for a given UE 108 in the data obtained by network data collector 204 for the respective period day, and a "−1" to indicate the absence of such data. By way of a further non-limiting example, "UE 2" was seen on days 1-3, 6 and 7 and was not seen on days 5 and 6.

Data structure 440, shown in example 400 of FIG. 4, can be used to store UE category and rank information in category and rank DB 214. As shown in example 400 of FIG. 4, data structure 440 can comprise a UE ID field 442, a manufacturer data field 444, a category ID field 446, a UE rank data field 448 and a MRSSI data field 450.

As discussed, network communication protocol parameters can comprise a MAC address and host name (stored in fields 306 and 308, respectively, of data structure 302). One or both of the MAC address and host name corresponding to a UE 108 can be used to determine a manufacturer of the UE 108, and the determined manufacturer and host name can be used to determine a UE category for the UE 108.

In accordance with one or more embodiments, UE data generator 206 can extract a portion of a UE's MAC address stored in field 306 to use as an Organizational Unique Identifier (OUI). By way of a non-limiting example, a MAC address can comprise a number of pairs (e.g., 8 pairs) of hexadecimal digits, and the first three pairs can be used as the OUI. The OUI can indicate a specific manufacturer for the UE 108. UE data generator 206 can use the UE's OUI as an index into a data structure comprising OUI-to-manufacturer mappings. The OUI-to-manufacturer mappings data structure can be maintained by UE data generator 206, a third party, etc. UE data generator 206 can use the OUI determined for a UE 108 to perform a lookup into the OUI-to-manufacturer mappings data structure to identify a manufacturer of the UE 108, if the data structure includes a corresponding mapping.

In some cases, the OUI-to-manufacturer mapping may not include a corresponding mapping indicating a manufacturer for the UE 108. UE data generator 206 can use the host name (stored in field 308 of data structure 302) to determine the manufacturer. In a case that UE data generator 206 maintains the OUI-to-manufacturer mappings, UE data generator 206 can update the OUI-to-manufacturer mapping to include a mapping between the OUI of the UE 108 and the manufacturer determined using the host name of the UE 108.

By way of a non-limiting example, if the OUI-to-manufacturer mapping data structure does not include a mapping corresponding to the OUI of a UE 108, UE data generator 206 can analyze the host name corresponding to the UE 108 by parsing the host name to search for one or more predefined strings indicative of a manufacturer. By way of a further non-limiting example, in example 300, by analyzing the host name "Carla-iPhone," UE data generator 206 can determine that the UE 108 is an iPhone® and the manufacture is Apple®.

In accordance with one or more embodiments, UE data generator 206 can use the host name (stored in field 308 of data structure 302) and the manufacturer (stored in field 344 of data structure 340) to assign a corresponding UE 108 to one of a set of UE categories. By way of some non-limiting examples, the set of UE categories can comprise a phone/tablet category (e.g., "Cat 1"), TVs/Computers/Laptops (e.g., "Cat 2"), IoTs category (e.g., "Cat 3") and an "Others" Category (e.g., "Cat 4"). Additional and/or different UE categories can be used with embodiments of the present disclosure.

By way of a non-limiting example, the "Others" category (e.g., "Cat 4") can be assigned to a UE 108 with a "GameBox" host name and Sony® manufacturer. As shown in example 400 of FIG. 4, data structure 440 can store a category ID (in field 346) that is indicative of the UE category determined for each UE 108 by UE data generator 206.

In accordance with one or more embodiments, UE data generator 206 can determine a UE rank (stored in field 448 of data structure 440) using the frequency data stored in data structure 316. The UE rank can be an indicator of the number of periods (e.g., e.g., days) that a UE 108 is seen over a given number of periods. In example 400, a day constitutes a period of time and the number of periods is set to 7, such that the UE rank indicates the number of days that a UE 108 is seen in a week's time. It should be apparent that any period of time and number of periods can be used with embodiments of the present disclosure.

Using an example in which the number of periods is equal to 7 and presence/absence of a UE 108 for a given period is indicated by 1/−1 (respectively), a UE value, or UEval(UE ID), can range from 0 to 7. A UE value, or UEval, can be determined for a UE 108 with a corresponding UE ID using the following expression:

$$UEval(UE\_ID) = \sum\nolimits_{k=1}^{n} \text{value}(UE\_ID, \text{Period}(k)), \quad \text{Exp. (1)}$$

where UE ID identifies the UE 108, n represents the number of periods, k indicates a given period (from 1 to n) and Period(k) indicates a value (e.g., 1 or −1) indicating whether or not the identified UE 108 was seen in the current period. Using data structure 416 as an example, Expression (1) can be used to determine a sum of the values in fields 420-432 for a given UE 108.

In accordance with one more embodiments, a UE value (or UEval(UE ID)) determined for a UE 108 can be used to determine a UE rank (or UE rank) for the UE 108 using the following expression:

$$UE\_\text{rank}(UE\_ID) = (n+1) - \min(\max(0, UEval(UE\_ID), n)), \quad \text{Exp. (2)}$$

which determines the maximum of zero and UEval(UE ID) (e.g., determined for a UE 108 using Exp. (1)) as a maximum result, determines a minimum of the maximum result and the number of periods as a minimum result, and then subtracts the minimum result from the number of periods plus 1 to determine the UE rank of the UE 108.

The maximum determination can be used to ensure that the resulting value is at least equal to zero, and the minimum determination can be used to ensure that the resulting value does not exceed the number of periods. Using Exp. (2), a UE rank is at least equal to 1. In addition, assuming that a ranking value of 1 is the highest rank, Exp. (2) can be used to ensure that the higher the frequency (or UEval(UE ID)), the closer a determined rank is to 1.

In accordance with one or more embodiments, as shown in example 400, UE data generator 206 can determine and store a UE rank in field 448 (of data structure 440) for each UE 108 (identified using UE 1, UE 2 and UE 3 IDs) using the frequency values corresponding to each UE 108 given in data structure 416.

In accordance with one or more embodiments, UE data generator 206 can determine a mapped RSSI (stored in field 350 of data structure 340) using a mapping between RSSI value and mapped RSSI (MRSSI) score. By way of a non-limiting example, an RSSI value can range from 0 to −120 decibel milliwatts (dBM), with −120 being the poorest/ weakest (worst) signal strength. By way of a further non-limiting example, a first range of RSSI values (e.g., −30 dBM to −68 dBM) can be mapped to a first MRSSI score (e.g., 1) indicating a strong signal, a second range of RSSI values (e.g., −69 dBM to −79 dBM) can be mapped to a second MRSSI score (e.g., 0.5) indicating an average signal, and a third range of RSSI values (e.g., −80 dBM and beyond) can be mapped to a third MRSSI score (e.g., 0.1) indicating a poor (or weak) signal quality. Additional and/or different ranges and corresponding score can be used with embodiments of the present disclosure.

UE data generator 206 can determine an MRSSI score and store the determined MRSSI score in field 450 of data structure 440) for a UE 108 using an RSSI value (from field 310 of data structure 302) corresponding to the UE 108 and the mappings.

In accordance with one or more embodiments, UE data generator 206 can determine a weight (a UE category weight or UE category contribution) for each UE category using network communication protocol parameters obtained from an access device 106. By way of a non-limiting example, a CW (or category weight) can be determined for a UE category using the following expression:

$$CW(i) = \frac{\sum_{k \in UEx\ in\ Cat(i)} (TX + RX\ of\ the\ UE(k))}{\sum_{All\ Categories} (TX + RX\ of\ all\ UEs)}, \quad \text{Exp. (3)}$$

where i indicates the category for which the UE category weight is being determined, k indicates a current UE 108 and TX and RX refer to, respectively, the number of packets transmitted (or TX packets) and the number of packets received (or RX packets) for a given UE 108 or for a group of UEs 108 (e.g., UEs 108 in a given UE category, UEs 108 across UE categories, or the like).

According to Exp. (3), a UE category's weight can be determined using a sum of the TX and RX packet values (from fields 412 and 414, respectively, in data structure 402) corresponding to each UE 108 in the UE category and dividing the determined sum by the sum of the number of TX and RX packet of all of the UEs 108 across UE categories. As discussed below, a UE category weight corresponding to a UE category can be used in determining a network health score 110 for the corresponding UE category. In addition, as is discussed below, UE category weights corresponding to UE categories can be used in determining a network health score 110 for an access device 106.

In accordance with one or more embodiments the data generated by UE data generator 206 and stored in data structures 416, 440 and 460 can be used to determine one or more network health scores 110, which can be stored in network health score DB 216 via data structures 502 and 510. In accordance with one or more embodiments, data structure 502 can be used to store a network health score 110 determined for an access device 106 and data structure 510 can be used to store a network health score 110 for each of a number (e.g., a set of) UE categories.

In accordance with one or more embodiments, a network health score 110 for an access device 106 can be determined using the following:

$$\text{Score} = \sum_{i \in Cats} \left[ CW_i * \left( \sum_{j \in Cat\ i\ UEs} \left\{ \frac{(TX + RX\ of\ j^{th}\ UE)}{TX + RX\ of\ all\ Cat\ i\ UEs} * MRSSI \right\} \right) \right]. \quad \text{Exp. (4)}$$

where Score is a network health score 110 determined for the access device 106 across a set of UE categories, i is a UE-category index for the set of UE categories (e.g., the $i^{th}$ UE category), $CW_i$ is a category weight corresponding to the $i^{th}$ UE category, j is a UE 108 index (e.g., the $j^{th}$ UE 108), and MRSSI is the mapped RSSI score corresponding to the current (e.g., $j^{th}$) UE 108.

As illustrated by Expression (4), the Score can be determined using a weighted category score determined for each UE category in the set of UE categories. A weighted category score for a given UE category can be determined using a category weight determined for the category and a sum of modified packet-counts determined for the UEs 108 assigned to the UE category. The modified packet count for a UE 108 can be determined using the MRSSI determined for the UE 108 and a packet-count ratio determined for the UE 108. The packet-count ratio of the UE 108 can be a ratio of the number of packets transmitted and received by the UE 108 and the number of packets transmitted and received across the UEs 108 assigned to same UE category as the UE 108.

In accordance with one or more embodiments, a score determined for an access device 106 can be based on connectivity provided by the access device 106, where connectivity can be based on the signal strengths experienced by the UEs 108 connected to the access device 106. In accordance with one or more embodiments, an MRSSI associated with a UE 108 can represent the connectivity of the UE 108 via the access device 106.

As discussed, an MRSSI determined for a UE 108 can correspond to the RSSI (or signal strength) experienced by the UE 108. For example, MRSSI can have a value of 1.0, 0.5 or 0.1 indicating a strong (e.g., −30 dBM to −68 dBM), average (e.g., −69 dBM to −79 dBM) or poor/weak signal strength (e.g., −80 dBM and beyond), respectively. In accordance with one or more embodiments, the packet-count ratio determined for a UE 108 can be modified by the MRSSI in a case that the RSSI corresponding to the UE 108 maps to a signal strength that is considered to be an undesirable level of connectivity. By way of a non-limiting example, something other than a strong signal strength, such as an average or poor/weak signal strength, can be considered undesirable. By way of a further non-limiting example, assuming (for the sake of simplicity) that there is a single UE 108 in a UE category, the packet-count ratio for the UE 108 would be 1. A MRSSI value less than 1.0 (e.g., a value corresponding to an average or weak signal strength) results in a modified packet-count ratio that is less than 1.0. In other words, a less than optimal (e.g., an undesirable) signal strength can negatively impact (e.g., reduce) a modified packet-count ratio determined for a UE 108, which can, in turn, negatively impact the corresponding UE category's weighted category score and the score determined for the corresponding access device 106.

In accordance with one or more embodiments, a score for an access device 106 can determined across all of the UEs 108 connected to the access device. Alternatively, a score can be determined for an access device 106 using a subset of the UEs 108 connected to the access device 106. By way of a non-limiting example, the subset of UEs 108 can comprise the UEs 108 connected to the access device 106 that collectively contribute to a threshold percentage (e.g., 80 percent) of the total packet traffic (e.g., total packets transmitted and received) by the UEs 108 connected to the access device 106.

By way of a further non-limiting example, a packet count total can be determined for each UE 108 using the transmitted and received packet numbers corresponding to the UE 108. The UEs 108 can then be ordered based on each one's corresponding packet count total, and UEs 108 can be selected starting at the top of the order (e.g., the UE 108 with the largest packet count total) until a sum of the packet count totals corresponding to the selected UEs 108 is at least a threshold percentage (e.g., 80 percent) of total packet traffic determined for the access device 106 using the packet count totals of each of the UEs 108 connected to the access device 106. Where a tiebreaker is needed to select between two or more UEs 108 (e.g., where the two or more UEs 108 have the same packet count total) to include in the subset used to determine the score for an access device 106, the UE ranking (e.g., stored in field 448 of data structure 440) corresponding to each UE 108 can be used, where the UE 108 with the higher UE ranking can be selected before each UE 108 with a lesser UE ranking.

In accordance with one or more embodiments, data structure 502 (in example 500 of FIG. 5) can be used to store a network health score 110 for an access device (e.g., the Score determined using Expression (4)). As shown in example 500, data structure 502 can comprise an access device ID field 504, a date field 506 and a score field 508. Score field 508 can be used to store a network health score 110 determined for the access device identified in the access device ID field 504. Data structure 502 can be used to store an access device score for a number of access devices 106 and/or a number of access device scores for a respective access device 106.

In accordance with one or more embodiments, a network health score 110 can be determined for a UE category (in the set of UE categories) using a network health score 110 determined for a corresponding access device 106 and the category weight corresponding to the UE category. Data structure 510 (in example 500 of FIG. 5) can be used to store network health scores 110 for a UE category in the set of UE categories.

As shown in example 500, data structure 510 can comprise an access device ID field 512, a date field 514 and UE category field 516 and a UE category score field 518. Data structure 502 can be used to store a UE category's network health score 110 (in UE category score field 518) for each UE category in the set of UE categories using a network health score 110 determined for a corresponding access device 106 (e.g., the access device 106 identified in field 512 of data structure 510).

Figure 6:
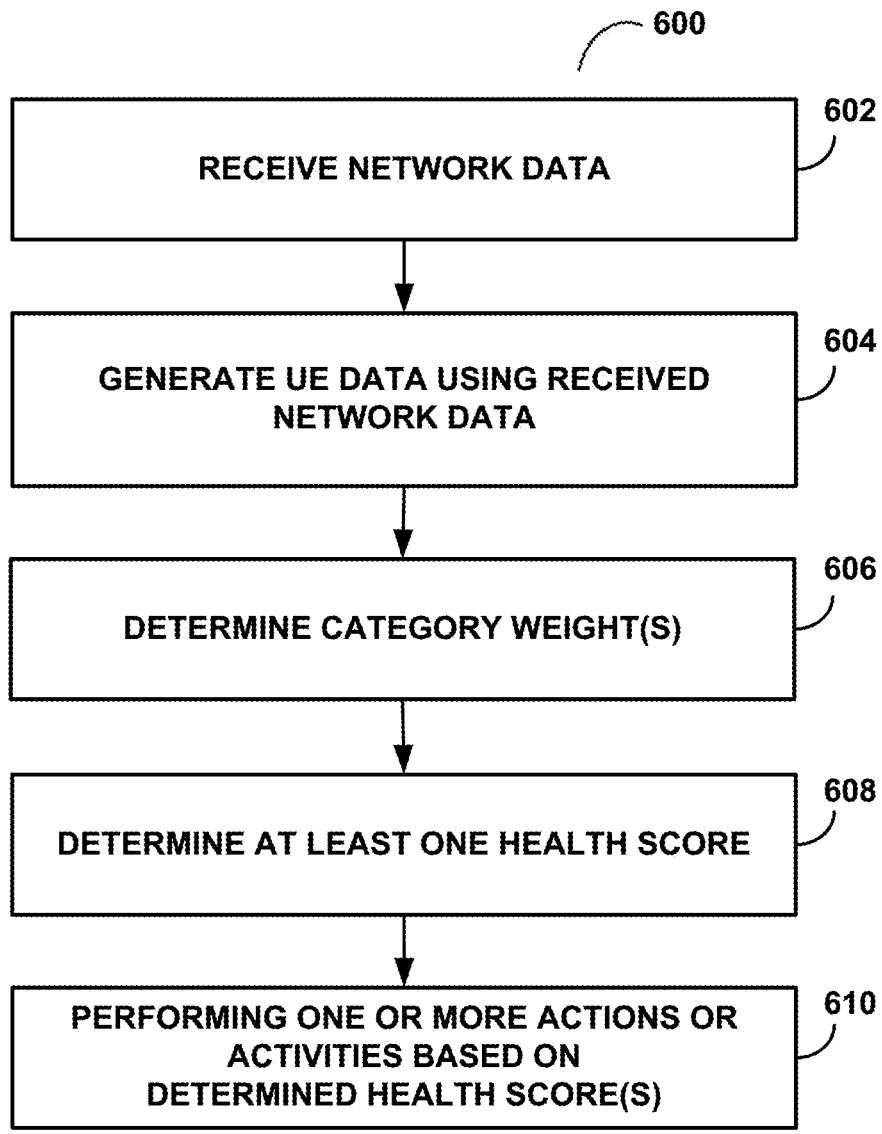
FIG. 6 provides an example of a network health score estimation process flow used in accordance with one or more embodiments of the present disclosure.

FIG. 6 provides an example of a network health score estimation process flow used in accordance with one or more embodiments of the present disclosure. The network health score estimation process flow 600 can be performed by network health estimation engine 102. As discussed herein, network health estimation engine 102 can comprise network data collector 204, UE data generator 206 and network health estimator 208.

At step 602 of process flow 600, network data can be received. By way of a non-limiting example, step 602 can be performed by network data collector 204. By way of a further non-limiting example, network data collector 204 can communicate a request (e.g., TR-069 parameter pull request) to an access device 106 to fetch the network data from the access device 106. The network data can comprise parametric data (e.g., network communication protocol parameters) maintained by an access device 106 in connection with each UE 108 connected to the access device 106. By way of a further non-limiting example, the network communication protocol parameters can include Technical Report 069 (TR-069) parameters. Additional and/or different parameters associated with network communication protocols that are different than TR-069 may be used.

As yet another non-limiting example, the network data received at step 602 can include a MAC address and host name assigned to each UE 108 connected to the access device 106 as well as, for each such UE 108, received signal strength indicator (RSSI) data, and information indicating a number of data packets received and transmitted by the UE 108. As discussed herein, in accordance with one or more embodiments, data structure 302 can be used to store the received network data in UE DB 210.

At step 604, UE data can be generated using the network data. By way of a non-limiting example, step 604 can be performed by UE data generator 206. By way of a further non-limiting example, UE data can be generated for each UE 108 connected to an access device 106 using the network data received for each such UE at step 604 and stored in UE DB 210. In accordance with one or more embodiments, the UE data generated at step 604 can include UE manufacturer, UE category, mapped RSSI (or MRSSI), UE frequency, and UE rank information. In accordance with one or more embodiments, data structure 416 can be used to store UE frequency data in frequency DB 212 and data structure 440 can be used to store manufacturer, UE category, UE rank and MRSSI data in category and rank DB 214.

In accordance with one or more embodiments, UE manufacturer can be determined for a UE 108 using a portion (e.g., the first three pairs of hexadecimal digits) of the MAC address of the UE 108. As discussed herein, the MAC address of a UE 108 can be stored in field 306 of data structure 302 (e.g., in UE DB 210). The extracted portion of the MAC address can be used as an OUI of the UE 108, where the OUI can be used as an index into a data structure comprising OUI-to-manufacturer mappings. By way of a non-limiting example, the OUI determined for a UE 108 can be used to perform a lookup into the OUI-to-manufacturer mappings data structure to identify a manufacturer of the UE 108, if the data structure includes a corresponding mapping.

In some cases, the OUI-to-manufacturer mapping may not include a corresponding mapping indicating a manufacturer for the UE 108. In such a case, the host name (stored in field 308 of data structure 302) can be used to determine the manufacturer of the UE 108. By way of a non-limiting example, if the OUI-to-manufacturer mapping data structure does not include a mapping corresponding to the OUI of a UE 108, UE data generator 206 can analyze the host name corresponding to the UE 108 by parsing the host name to search for one or more predefined strings indicative of a manufacturer. By way of a further non-limiting example, in example 300, by analyzing the host name "Carla-iPhone," UE data generator 206 can determine that the UE 108 is an iPhone® and the manufacture is Apple®.

In accordance with one or more embodiments, the data generated at step 604 can include a UE category determined for a UE 108 using the host name (stored in field 308 of data structure 302) and the manufacturer (stored in field 344 of data structure 340), as discussed herein.

In accordance with one or more embodiments, the data generated at step 604 can include a mapped RSSI (stored in field 350 of data structure 340), where the mapped RSSI (or MRSSI) can be determined using a mapping between RSSI value and RSSI score. By way of a non-limiting example, a first range of RSSI values (e.g., −30 dBM to −68 dBM) can be mapped to a first MRSSI score (e.g., 1) indicating a strong signal, a second range of RSSI values (e.g., −69 dBM to −79 dBM) can be mapped to a second MRSSI score (e.g., 0.5) indicating an average signal, and a third range of RSSI values (e.g., −80 dBM and beyond) can be mapped to a third MRSSI score (e.g., 0.1) indicating a poor (or weak) signal quality. Additional and/or different ranges and corresponding score can be used with embodiments of the present disclosure.

A determined MRSSI score can be stored in field 450 of data structure 440) for a UE 108, where the MRSSI is determined using an RSSI value (from field 410 of data structure 402) corresponding to the UE 108 and the mappings.

In accordance with one or more embodiments, the data generated at step 604 can include a UE frequency information (e.g., in fields 420-432 of data structure 416 stored in frequency DB 212). As discussed, network communication protocol parameters can be periodically obtained from an access device 106. The network communication protocol parameters obtained for a respective period (e.g., a day, week, etc.) can be used to determine whether or not a respective UE 108 is "seen" (or is present) during the respective period. By way of a non-limiting example, the respective UE 108 is "seen" (or is present) in the respective period if network communication protocol parameters corresponding to the respective period are obtained for the UE 108 (from the access device 106).

With reference to data structure 416, where network communication protocol parameters are retrieved daily, daily frequency information can be generated corresponding to the each daily fetch of network communication protocol parameters. Fields 420-432 store a value (e.g., 1 or −1) indicating whether or not the UE 108 is seen for a respective day. By way of a non-limiting example, UE data generator 206 can store a "1" in one of fields 420-432 corresponding to a respective period to indicate the presence of network communication protocol parameters for a given UE 108 in the retrieved network communication protocol parameters, or a "−1" to indicate the absence of such data.

As discussed, in accordance with one or more embodiments, the UE frequency information determined for a UE 108 can be used to determine a UE rank for the UE 108, where the UE rank can be determined using Expressions (1) and (2).

As discussed, in accordance with one or more embodiments, one or both of the MAC address and host name corresponding to a UE 108 can be used to determine a manufacturer of the UE 108, and the determined manufacturer and host name can be used to determine a UE category for the UE 108.

Data structure 440, shown in example 400 of FIG. 4, can be used to store UE category and rank information in category and rank DB 214.

At step 606, category weight(s) can be determined. By way of a non-limiting example, step 604 can be performed by UE data generator 206. By way of a further non-limiting example, UE data generator 206 can determine a UE category weight for each UE category (in a set of UE categories to which a UE 108 can be assigned) using network communication protocol parameters obtained from an access device 106 and Expression (3). In accordance with one or more embodiments, a UE category weight determined at step 606 can be stored in category and rank DB 214 using data structure 460. As shown in example 400 of FIG. 4, data structure 460 can comprise a category ID field 462 and a category weight field 464.

At step 608, at least one network health score can be determined. By way of a non-limiting example, step 608 can be performed by network health estimator 208 using the network data and the data generated by UE data generator 206 at steps 604 and 606 and stored in DBs 212 and 214 (e.g., via data structures 416, 440 and 460).

In accordance with one or more embodiments, the obtained network communication protocol parameters and the information derived from the network communications protocol parameters can be used to generate network health scores 110, at step 610. In accordance with one or more embodiments, network health estimation engine 102 can use the obtained network communication protocol parameters to generator (or derive) other information, such as and without limitation a UE manufacturer, UE category, mapped RSSI, UE frequency, and UE rank. In accordance with one or more embodiments, the obtained network communication protocol parameters and the information derived from the network communications protocol parameters can be used to generate a network health scores 110. By way of some non-limiting examples, a network health score 110 can be generated for given period of time (e.g., daily, weekly, etc.) and can be determined for a given access device 106. By way of a further non-limiting example, a network health score 110 can be determined for a number of UE categories and a given access device 106.

As discussed, in accordance with one or more embodiments, Expression (4) can be used to determine a network health score 110 (e.g., the Score determined using Expression (4)) for an access device 106. In accordance with one or more embodiments, a network health score 110 determined for an access device 106 can be used to determine a network health score 110 for each of one or more UE categories using a respective UE category weight determined (e.g., using Expression (3)) for a corresponding UE category.

At step 610, one or more actions and/or activities can be performed based on a determined network health score. By way of a non-limiting example, one or more network health scores 110 determined at step 608 can be used to identify and/or perform one or more actions and/or activities.

By way of a non-limiting example, network health scores 110 can be grouped by geographical area (e.g., by zip codes) and the resulting geographical groupings of network health scores 110 can be output (e.g., via a graphical user interface) to show geographic areas experiencing poor network health (e.g., poor Wi-Fi performance). By way of a further non-limiting example, a network health score graphical user interface (GUI) can be generated comprising a number of geographic areas and a number of network health scores for each of the number of geographic areas. The network health score GUI can show each geographic area experiencing poor network health. One or more remedial actions can be identified and/or performed to address/correct the poor network health problem. The actions can be taken to avoid an outage, for example.

By way of another non-limiting example, the determined network health score(s) 110 associated with a given user (e.g., customer) can be analyzed to identify fluctuations in network performance, and the users can be contacted proactively via one or more channels (e.g., customer application, push notifications, text messages, or the like) to notify the user about the potential issue and a corresponding fix.

As yet another non-limiting example, one or more network health scores 110 can be used to improve user (e.g., customer experience). The one or more network health scores 110 can be used analyzed to determine a potential problem and/or to identify a user (or customer) intent corresponding to the user's contact. For example, customer intent (identified using network health score(s) 110) can be used to aptly engage a customer when the customer reaches out through a support channel (e.g., customer application, online customer support chat, telephonic support or the like) thereby improving the customer's experience.

Network health can be negatively impacted for cellular network customers attempting to connect multiple devices using certain connection plans with limited bandwidth. The poor network health can be the result of the devices vying for the limited bandwidth. The corresponding network health score(s) 110 can be analyzed along with the devices being used, and a recommendation can be made based on the analysis. Some non-limiting example recommendations include recommending a more suitable connection plan, network configuration recommendation (e.g., recommending a Wi-Fi extender or other network hardware installation or upgrade), UE upgrade recommendation or the like.

With Fifth-Generation (5G) Fixed Wireless Access (FWA) routers, signals can be received from mounted 5G radios. A 5G FWA router can be used to provide 5G home service, for example. The type of building materials housing the routers can contribute to signal fluctuations. The network health score(s) 110 determined in accordance with at least one disclosed embodiment can be used to analyze network health over a range of households (or buildings). The analysis can be used to make recommendations, such as and without limitation recommending a specific 5G FWA plan, recommending a network configuration (e.g., additional equipment to boost the signal), recommending that the installation be performed by a trained technician, or the like.

By way of another non-limiting example, one or more network health scores 110 can be analyzed to identify a pattern of poor network health. For example, poor network health scores 110 being experienced by a customer (e.g., a customer's household) can be observed and used to make a determination to initiate a self-healing reboot when the data-traffic is low (night time) in order to address the poor network health.

In accordance with one or more embodiments, network health scores 110 can be used to determine whether to include signal-boosting equipment (e.g., a Wi-Fi extender) in a new or existing site (e.g., a household, commercial building, etc.). By way of a non-limiting example, network health scores 110 can be determined for several households in a geographic area (e.g., a city). Assume, for the sake of example, the geographic area includes two neighborhoods with houses built by different builders using different building materials that may or may not negatively impact network (e.g., Wi-Fi) signals. Network health scores 110 determined for the neighborhoods and/or particular houses within the neighborhoods can be used to identify buildings that have undesirable (e.g., average or poor) signal strength. Signal-boosting equipment (e.g., Wi-Fi extenders) can be recommended to boost the signal strength. Network health scores 110 can be correlated to builders, and signal-boosting equipment can be recommended based on the builder, building materials used, etc.

Figure 7:
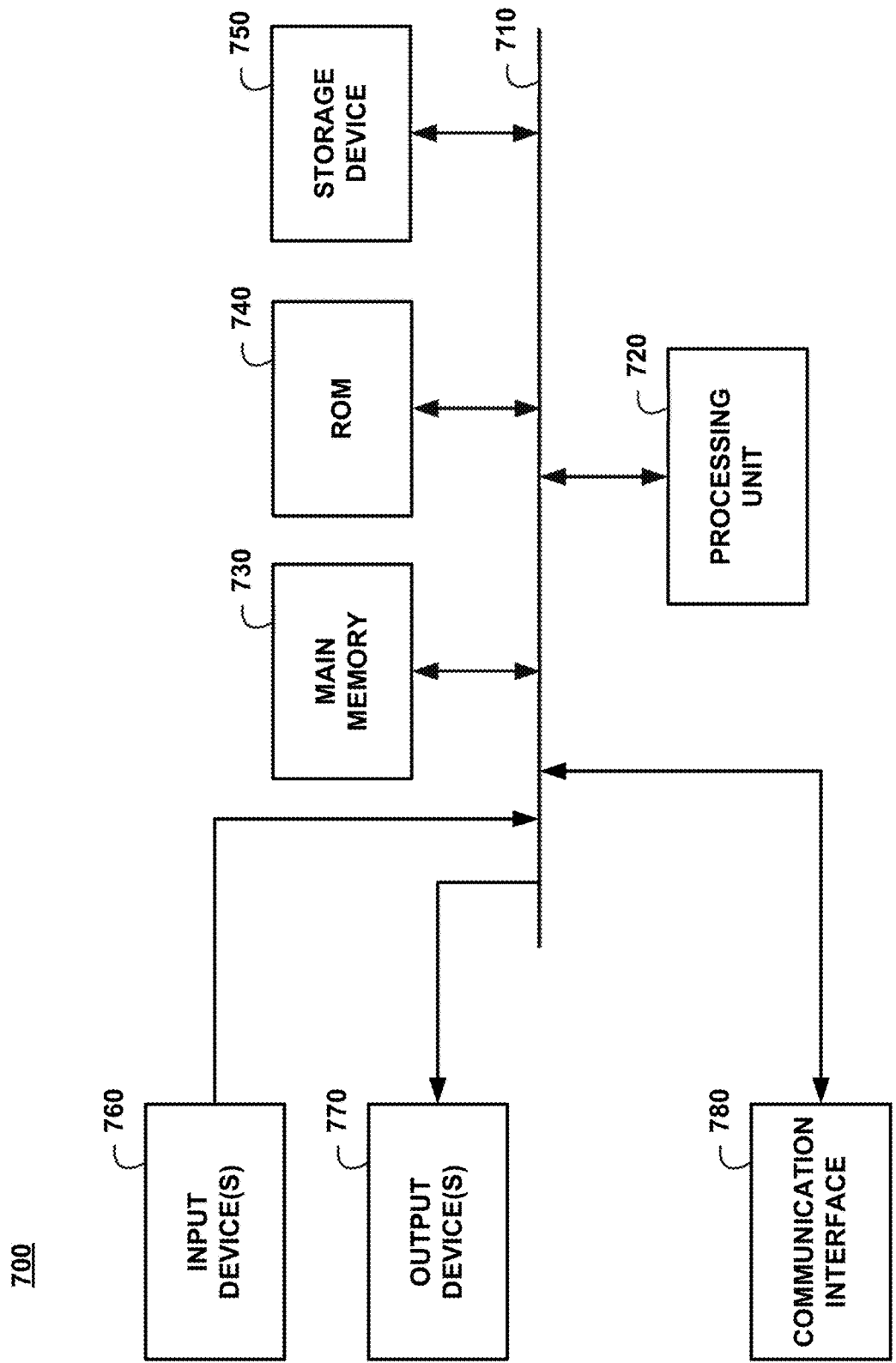
FIG. 7 provides a diagram of exemplary components of a computing device in accordance with one or more embodiments of the present disclosure.

FIG. 7 provides a diagram of exemplary components of a computing device in accordance with one or more embodiments of the present disclosure. Network health estimation engine 102 (and/or components thereof, such as network data collector 204, UE data generator 206 and network health estimator 208), access device 106 and UE 108 can be configured the same as, or similar to, device 700.

Device 700 can include a bus 710, a processing unit 720, a main memory 730, a read only memory (ROM) 740, a storage device 750, an input device(s) 760, an output device(s) 770, and a communication interface 780. Bus 710 can include a path that permits communication among the elements of device 700.

Processing unit 720 can include one or more processors or microprocessors which may interpret and execute instructions. Additionally, or alternatively, processing unit 720 can include processing logic that executes one or more operations of a process(es).

Main memory 730 can include a random access memory (RAM) or another type of dynamic storage device that may store information and, in some implementations, instructions for execution by processing unit 720. ROM 740 can include a ROM device or another type of static storage device (e.g., Electrically Erasable Programmable ROM (EEPROM)) that may store static information and, in some implementations, instructions for use by processing unit 720. Storage device 750 can include a magnetic, optical, and/or solid state (e.g., flash drive) recording medium and its corresponding drive. Main memory 730, ROM 740 and storage device 750 can each be referred to herein as a "non-transitory computer-readable medium" or a "non-transitory storage medium." The processes/methods set forth herein can, at least in part, be implemented as instructions that are stored in main memory 730, ROM 740 and/or storage device 750 for execution by processing unit 720.

Input device 760 can include one or more mechanisms that permit an operator (e.g., a user) to input information to device 700, such as, for example, a keypad or a keyboard, a display with a touch sensitive panel, voice recognition and/or biometric mechanisms, etc. Output device 770 can include one or more mechanisms that output information to the operator, including a display, a speaker, etc. Communication interface 780 may include one or more transceivers that enable device 700 to communicate with other devices and/or systems. For example, communication interface 780 may include wired and/or wireless transceivers for communicating via a network, such as network 104, local area network or the like.

The configuration of components of device 700 illustrated in FIG. 7 is for illustrative purposes only. Other configurations may be implemented. Therefore, device 700 can include additional, fewer and/or different components than those depicted in FIG. 7.

At least some embodiments of the present disclosure are related to the use of device 700 for implementing some or all of the techniques described herein. According to one embodiment, those techniques are performed by device 700 in response to processing unit 720 executing one or more sequences of one or more processor instructions contained in main memory 730. Such instructions, also called computer instructions, software and program code, may be read into main memory 730 from another computer-readable medium, such as a storage device 750 or a network link (not shown). Execution of the sequences of instructions contained in main memory 730 causes processing unit 720 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
obtaining, by a computing device, network data associated with one or more user equipments (UEs) connected to a network;
generating, by the computing device, UE data for the one or more UEs using the network data, the generating comprising assigning each of the one or more UEs to a UE category from a set of UE categories, the UE data, for each of the one or more UEs, comprising frequency data, manufacturer information, UE category identifier (ID), UE rank and a mapped RSSI (MRSSI);
determining, by the computing device, a set of UE category weights corresponding to the set of UE categories using the network data;
determining, by the computing device, at least one network health score for the one or more UEs using the network data, the generated UE data and the set of UE category weights; and
causing, by the computing device, performance or at least one action in accordance with the determined at least one network health score.

2. The method of claim 1, wherein the network data, for each of the one or more UEs, comprises a Medium Access Control (MAC) address, a host name, received signal strength indicator (RSSI) data, a number of received packets and a number of transmitted packets.

3. The method of claim 2, generating UE data for the one or more UEs further comprising:

extracting, by the computing device, for a UE of the one or more UEs, an organizational unique identifier (OUI) from the MAC address of the UE; and
mapping, by the computing device, the OUI of the UE to information indicating a manufacture of the UE.

4. The method of claim 3, further comprising:
using, by the computing device, the manufacturer information and host name associated with the UE to assign the UE to a UE category from the set of UE categories.

5. The method of claim 1, wherein the frequency data, for the UE, is representative of a number of periods of time, each period corresponding to an attempt to obtain the network data for the UE, the frequency data indicating either a presence or absence of the network data for each attempt.

6. The method of claim 5, further comprising:
using, by the computing device, the frequency data associated with the UE to determine the UE rank for the UE.

7. The method of claim 1, wherein the network data comprises Technical Report 069 (TR-069) parametric data associated with the one or more UEs.

8. The method of claim 1, wherein the at least one action caused to be performed comprises generating a network health score graphical user interface comprising a number of geographic areas and a number of network health scores for each of the number of geographic areas.

9. The method of claim 1, wherein the at least one action caused to be performed comprises at least one of the following:
recommending, to at least one UE user, at least one network service and/or UE upgrade identified using the at least one network health score;
recommending at least one network configuration identified using the at least one network health score;
recommending, for a household in a geographic area, a network configuration comprising at least one Wi-Fi extender based on a comparison of network health scores determined for the geographic area;
communicating at least one electronic notification to the one or more UEs regarding a current or potential issue identified using the at least one network health score;
responsive to contact from a user of a UE of the one or more UEs, identifying an intent of the user using the at least one network health score; and
causing a reboot of at least one of the UE and a network access device to address an issue identified using the at least one network health score.

10. A non-transitory computer-readable storage medium tangibly encoded with computer-executable instructions that when executed by a processor associated with a computing device perform a method comprising:
obtaining network data associated with one or more user equipments (UEs) connected to a network;
generating UE data for the one or more UEs using the network data, the generating comprising assigning each of the one or more UEs to a UE category from a set of UE categories, the UE data, for each of the one or more UEs, comprising frequency data, manufacturer information, UE category identifier (ID), UE rank and a mapped RSSI (MRSSI);
determining a set of UE category weights corresponding to the set of UE categories using the network data;
determining at least one network health score for the one or more UEs using the network data, the generated UE data and the set of UE category weights; and
causing performance or at least one action in accordance with the determined at least one network health score.

11. The non-transitory computer-readable storage medium of claim 10, wherein the network data, for each of the one or more UEs, comprises a Medium Access Control (MAC) address, a host name, received signal strength indicator (RSSI) data, a number of received packets and a number of transmitted packets.

12. The non-transitory computer-readable storage medium of claim 11, generating UE data for the one or more UEs further comprising:
   extracting for a UE of the one or more UEs, an organizational unique identifier (OUI) from the MAC address of the UE; and
   mapping the OUI of the UE to information indicating a manufacture of the UE.

13. The non-transitory computer-readable storage medium of claim 12, further comprising:
   using the manufacturer information and host name associated with the UE to assign the UE to a UE category from the set of UE categories.

14. The non-transitory computer-readable storage medium of claim 10, wherein the frequency data, for the UE, is representative of a number of periods of time, each period corresponding to an attempt to obtain the network data for the UE, the frequency data indicating either a presence or absence of the network data for each attempt.

15. The non-transitory computer-readable storage medium of claim 14, further comprising:
   using, by the computing device, the frequency data associated with the UE to determine the UE rank for the UE.

16. The non-transitory computer-readable storage medium of claim 10, wherein the at least one action caused to be performed comprises generating a network health score graphical user interface comprising a number of geographic areas and a number of network health scores for each of the number of geographic areas.

17. The non-transitory computer-readable storage medium of claim 10, wherein the at least one action caused to be performed comprises at least one of the following:
   recommending, to at least one UE user, at least one network service and/or UE upgrade identified using the at least one network health score;
   recommending at least one network configuration identified using the at least one network health score;
   communicating at least one electronic notification to the one or more UEs regarding a current or potential issue identified using the at least one network health score;
   responsive to contact from a user of a UE of the one or more UEs, identifying an intent of the user using the at least one network health score; and
   causing a reboot of at least one of the UE and a network access device to address an issue identified using the at least one network health score.

18. A computing device comprising:
a processor, configured to:
   obtain network data associated with one or more user equipments (UEs) connected to a network;
   generate UE data for the one or more UEs using the network data, the generating comprising assigning each of the one or more UEs to a UE category from a set of UE categories, the UE data, for each of the one or more UEs, comprising frequency data, manufacturer information, UE category identifier (ID), UE rank and a mapped RSSI (MRSSI);
   determine a set of UE category weights corresponding to the set of UE categories using the network data;
   determine at least one network health score for the one or more UEs using the network data, the generated UE data and the set of UE category weights; and
   cause performance or at least one action in accordance with the determined at least one network health score.

* * * * *